(12) United States Patent
Yoshida

(10) Patent No.: US 10,812,188 B2
(45) Date of Patent: Oct. 20, 2020

(54) OPTICAL TRANSMISSION METHOD AND OPTICAL TRANSMISSION SYSTEM

(71) Applicant: MITSUBISHI ELECTRIC CORPORATION, Tokyo (JP)

(72) Inventor: Tsuyoshi Yoshida, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/095,759

(22) PCT Filed: Jun. 13, 2016

(86) PCT No.: PCT/JP2016/067512
§ 371 (c)(1),
(2) Date: Oct. 23, 2018

(87) PCT Pub. No.: WO2017/216836
PCT Pub. Date: Dec. 21, 2017

(65) Prior Publication Data
US 2020/0145102 A1    May 7, 2020

(51) Int. Cl.
*H04B 10/2569* (2013.01)
*H04B 10/54* (2013.01)
(Continued)

(52) U.S. Cl.
CPC ......... *H04B 10/2569* (2013.01); *H04B 10/54* (2013.01); *H04B 10/616* (2013.01); *H04J 14/02* (2013.01)

(58) Field of Classification Search
CPC ............ G01J 4/00; G01J 4/04; G01M 11/336; G01M 11/337; G01N 21/21;
(Continued)

(56) References Cited

U.S. PATENT DOCUMENTS 5,511,082 A * 4/1996 How .................. H03M 13/23
714/790
5,953,377 A * 9/1999 Yoshida .............. H04L 27/3416
375/295
(Continued)

FOREIGN PATENT DOCUMENTS

EP    1 708 391 A1    10/2006
EP    2 924 890 A1     9/2015
(Continued)

OTHER PUBLICATIONS

Extended European Search Report dated Apr. 11, 2019 issued in counterpart European Application No. 16905391.5.
(Continued)

*Primary Examiner* — Amritbir K Sandhu
(74) *Attorney, Agent, or Firm* — Birch, Stewart, Kolasch & Birch, LLP

(57) ABSTRACT

Provided is an optical transmission method including: executing mapping processing (112) so that information of one unit of one system, or one unit of each of a plurality of systems, is mapped in a pattern of two or more Stokes vectors orthogonal between slots of a multi-time slot; generating an optical signal from an electric signal processed by the mapping processing; and transmitting the optical signal. A reception side receives the optical signal and converts the received optical signal into an electric signal, and executes de-mapping processing (322) for conversion into the information of one unit of one system, or one unit of each of a plurality of systems, by selecting high-likelihood bit information in association with the mapping processing in which the information is mapped in the pattern of Stokes vectors orthogonal between the slots of the multi-time slot.

7 Claims, 11 Drawing Sheets

(51) Int. Cl.
 *H04B 10/61* (2013.01)
 *H04J 14/02* (2006.01)
(58) Field of Classification Search
 CPC ............ H04B 10/2569; H04B 10/2572; H04B 10/516; H04B 10/54; H04B 10/61; H04B 10/616; H04J 14/02
 See application file for complete search history.

(56) References Cited

U.S. PATENT DOCUMENTS

| | | | | |
|---|---|---|---|---|
| 6,501,396 | B1* | 12/2002 | Kryzak | H03M 5/145 |
| | | | | 341/58 |
| 8,634,723 | B2* | 1/2014 | Meiman | H04B 10/2572 |
| | | | | 359/483.01 |
| 10,320,486 | B1* | 6/2019 | Kojima | H04L 27/36 |
| 10,484,131 | B2* | 11/2019 | Oveis Gharan | H04L 1/0058 |
| 10,587,358 | B1* | 3/2020 | Ebrahimzad | H04J 14/0298 |
| 2005/0233710 | A1* | 10/2005 | Lakkis | H04B 1/71637 |
| | | | | 455/102 |
| 2009/0015446 | A1* | 1/2009 | Coene | H03M 7/40 |
| | | | | 341/59 |
| 2009/0285582 | A1* | 11/2009 | Miao | H04B 10/2569 |
| | | | | 398/147 |
| 2010/0275100 | A1* | 10/2010 | Yokokawa | H03M 13/356 |
| | | | | 714/763 |
| 2011/0010609 | A1* | 1/2011 | Diab | H04L 1/0041 |
| | | | | 714/780 |
| 2012/0260142 | A1* | 10/2012 | Arabaci | H03M 13/1171 |
| | | | | 714/752 |
| 2012/0307934 | A1* | 12/2012 | Heidari | H04L 1/0003 |
| | | | | 375/295 |
| 2013/0343446 | A1* | 12/2013 | Eliaz | H04L 25/03821 |
| | | | | 375/230 |
| 2014/0133865 | A1 | 5/2014 | Reimer et al. | |
| 2014/0369680 | A1* | 12/2014 | Oveis Gharan | H04L 27/3405 |
| | | | | 398/27 |
| 2020/0145102 | A1* | 5/2020 | Yoshida | H04B 10/2569 |

FOREIGN PATENT DOCUMENTS

| | | | |
|---|---|---|---|
| WO | WO 2013/000746 A1 | 1/2013 | |
| WO | WO-2013000746 A1 * | 1/2013 | ......... H04B 10/2569 |

OTHER PUBLICATIONS

Agrell et al., "Power-Efficient Modulation Formats in Coherent Transmission Systems," Journal of Lightwave Technology, vol. 27, No. 22, pp. 5115-5126, 2009.

Bruyère et al., "Demonstration of an Optimal Polarization Scrambler for Long-Haul Optical Amplifier Systems," IEEE Photonics Technology Letters, vol. 6, No. 9, pp. 1153-1155, 1994.

Matsuda et al., "DSP-based Symbol-wise SOP Scrambling for Polarization-Multiplexed QAM Signals," Advanced Photonics, SPPcom, SpS4D.1, 2015, 3 pages.

Millar et al., "High-dimensional modulation for coherent optical communications systems," Optics Express, vol. 22, No. 7, pp. 8798-8812, 2014.

Salsi et al., "Recent Advances in Submarine Optical Communication Systems," Bell Labs Technical Journal, vol. 14, No. 4, pp. 131-148, 2010.

Yamazaki et al., "Fast optical channel recovery in field demonstration of 100-Gbit/s Ethernet over OTN using real-time DSP," Optics Express, vol. 19, No. 14, pp. 13179-13184, 2011.

* cited by examiner

1 OPTICAL TRANSMISSION SYSTEM

100 OPTICAL TRANSMISSION UNIT

320 RECEPTION ELECTRICAL PROCESSING UNIT

112 MAPPING UNIT

322 DE-MAPPING UNIT

POLARIZATION STATE
(LINEAR POLARIZATION)

OPTICAL TRANSMISSION METHOD AND OPTICAL TRANSMISSION SYSTEM

TECHNICAL FIELD

The present invention relates to an optical transmission method and an optical transmission system with which an optical signal is transmitted and received.

BACKGROUND ART

Issues to be addressed in long-distance transmission of large-capacity data via an optical fiber are high-density signal multiplexing, the management of polarization state, and the overcoming of fiber non-linear optical effects.

An optical transmission device can have an increased transmission capacity per optical fiber by high-density wavelength multiplexing in which different pieces of information are carried on a plurality of optical carrier waves or optical sub-carrier waves, which are sub-carriers. Each of multiplexed optical carrier waves, as well as each of multiplexed optical sub-carrier waves, is called a channel. The transmission capacity can be increased also by using multilevel modulation.

One way to accomplish long-distance transmission and large-capacity transmission is to expand the transmission capacity by increasing signal points and accordingly increasing the number of bits transmitted per symbol as in m-ary phase-shift keying (mPSK) and m-ary quadrature amplitude modulation (mQAM). In mPSK and mQAM, signals in an optical transmission device are generally allocated to an in-phase axis (I-axis) and a quadrature-phase axis (Q-axis).

Another known method uses polarization multiplexing to double the number of bits transmitted per symbol. In polarization multiplexing, signals can be allocated independently to a vertically polarized wave and a horizontally polarized wave, which are two polarized wave components orthogonal to each other.

Polarization multiplexed mPSK/mQAM uses a digital coherent method in which a local oscillation light source and a reception signal are caused to mix with and interfere with each other at a reception end to detect the resultant wave by coherent detection, and an electric signal obtained as a result of the coherent detection is compensated for by digital signal processing. In the digital coherent method, dual polarization (DP) quaternary PSK (QPSK) is widely used (see Non-Patent Literature 1 and Non-Patent Literature 2, for example).

Generally, "m" in mPSK or mQAM takes a value that is the n-th power of 2 (n: an integer equal to or larger than 1) to make n-bit information communication possible. On the other hand, the potential of coded modulation in which restrictions are put on those common patterns of signal point arrangement in an attempt to improve performance is being investigated as well (see Non-Patent Literature 3 and Non-Patent Literature 4, for example).

Simply put, while the number of bits communicated in one block is set to (n−1), as many signal points as required for n-bit information are prepared per block, a 1-bit parity bit is generated from the exclusive OR of (n−1) bits to be communicated, and communication is held with the use of signal points for n-bit information. A common way of configuring a 1-block code is to handle quadrature dual polarization, quadrature binary phase, multi-time slot, and the like together, and modulation in which the number of coordinate axes is N is called N-th order modulation. In N-th order modulation, performance improves by a limited amount compared to error correction coding in which the code length is long.

The relationship between the number of information bits and the number of parity bits can be changed by a simple method, and it is relatively easy to change the frequency utilization efficiency in a flexible manner. For instance, polarization switched-QPSK (PS-QPSK), which accomplishes 3 bits/symbol, is promising as an intermediate solution between DP-QPSK, which is a common way of implementing 4 bits/symbol, and DP-binary phase-shift keying (BPSK) (see Non-Patent Literature 5, for example), which accomplishes 2 bits/symbol.

In long-distance optical transmission, an optical signal power-to-noise power ratio suitable for the bit rate, the modulation method, the wave detection method, and the like is required to secure signal quality at the reception end and, to achieve that, a signal is required to be transmitted at high optical power. During high optical power transmission, non-linear optical effects taking place in an optical fiber cause waveform distortion, which degrades signal quality. Non-linear optical effects are roughly divided into effects that take place inside a channel and effects that take place between channels.

Non-linear optical effects taking place inside a channel include self-phase modulation (SPM). SPM is classified by narrower definitions into intra-channel SPM (ISPM), intra-channel cross-phase modulation (IXPM), intra-channel four-wave mixing (IFWM), and others. Non-linear optical effects taking place between channels include cross-phase modulation (XPM), four-wave mixing (FWM), and cross polarization modulation (XPolM).

Both types of non-linear optical effects become prominent when a signal has a high optical power density and when a signal is transmitted over a long distance. Non-linear optical effects taking place between channels cause optical signals of the channels to maintain correlation between the signals' polarization states long when a transmission path is small in local wavelength dispersion, or when the wavelength interval of channels to be multiplexed by wavelength multiplexing is narrow. The quality deteriorates more noticeably as the interaction lasts.

The polarization state of a polarization multiplexed signal changes depending on the optical phase difference between a vertically polarized wave and a horizontally polarized wave. The relation between a signal carried on a vertically polarized wave and a signal carried on a horizontally polarized wave accordingly affects the polarization states of the signals.

A polarization multiplexed signal is affected by polarization-dependent deterioration phenomena as well as a single-polarization signal. For instance, polarization-dependent loss (PDL) gives a signal power difference between orthogonal polarized waves, and causes noticeable deterioration particularly in a component on the side low in signal power. Signal quality is degraded also by XPolM, which causes high-speed polarization interference that cannot be eliminated completely by polarization isolation via an adaptive filter inside an optical reception device.

Polarization scrambling has been used to suppress the polarization-dependent deterioration phenomena of a single-polarization signal (see Non-Patent Literature 6, for example). Polarization scrambling is normally executed on the order of 10 kHz or higher, and also generates a harmonic wave. This is not a problem in an optical transmission system in which direct wave detection is used. In the digital coherent method, on the other hand, polarization isolation in an adaptive filter inside an optical reception device can keep up only at a limited speed, and polarization scrambling applied to a single-polarization signal is accordingly not applicable as it is.

In answer to this, a report has been made about polarization scrambling application in which the adaptive filter is not required to keep up and symbol synchronization is employed (see Non-Patent Literature 7, for example).

A method of managing the polarization state between slots of a multi-time slot by applying coded modulation has also been reported (see Patent Literature 1, for example).

CITATION LIST

Patent Literature

[PTL 1] US 2014-0133865 A1 Non Patent Literature
[NPL 1] Optical Internetworking Forum, 100 G Ultra Long Haul DWDM Framework Document", June 2009
[NPL 2] E. Yamazaki, and twenty-seven persons, "Fast optical channel recovery in field demonstration of 100-Gbit/s Ethernet (trademark) over OTN using real-time DSP", Optics Express, vol. 19, no. 14, pp. 13179-13184, 2011
[NPL 3] E. Agrell, and one person, "Power efficient modulation formats in coherent transmission systems", Journal of Lightwave Technology, vol. 27, no. 22, pp. 5115-5126, 2009
[NPL 4] D. Millar, and six persons, "High-dimensional modulation for coherent optical communications systems", Optics Express, vol. 22, no. 7, pp. 8798-8812, 2014
[NPL 5] M. Salsi, and seven persons, "Recent advances in submarine optical communication systems", Bell Labs Technical Journal, vol. 14, no. 4, pp. 131-148, 2010
[NPL 6] F. Bruyere, and four persons, "Demonstration of an optimal polarization scrambler for long-haul optical amplifier systems", Photonics Technology Letters, vol. 6, no. 9, pp. 1153-1155, 1994
[NPL 7] K. Matsuda, and two persons, "DSP-based symbol-wise SOP scrambling for polarization-multiplexed QAM signals", SPPcom, SpS4D.1, 2015

SUMMARY OF INVENTION

Technical Problem

With the related art described in Non-Patent Literature 3 and Non-Patent Literature 4 (PS-QPSK), unevenness in polarization state is caused depending on the data pattern, and the resultant problem is low resistance against the polarization-dependent deterioration phenomena (polarization-dependent loss, cross polarization modulation, and others).

The present invention has been made to solve the problem described above, and an object of the present invention is therefore to provide an optical transmission method and an optical transmission system that are enhanced in resistance against the polarization-dependent deterioration phenomena.

Solution to Problem

In order to achieve the above-mentioned object, according to one embodiment of the present invention, there is provided an optical transmission method including: executing mapping processing so that information of one unit of one system, or one unit of each of a plurality of systems, is mapped in a pattern of two or more Stokes vectors orthogonal between slots of a multi-time slot; generating an optical signal from an electric signal processed by the mapping processing, and transmitting the optical signal; receiving the optical signal and converting the received optical signal into an electric signal; and executing de-mapping processing for conversion into the information of one unit of one system, or one unit of each of a plurality of systems, by selecting high-likelihood bit information in association with the mapping processing in which the information is mapped in the pattern of Stokes vectors orthogonal between the slots of the multi-time slot.

Further, according to one embodiment of the present invention, there is provided an optical transmission system including: an optical transmission unit including a mapping unit, which is configured to execute mapping processing so that information of one unit of one system, or one unit of each of a plurality of systems, is mapped in a pattern of two or more Stokes vectors orthogonal between slots of a multi-time slot, and an optical signal generation unit, which is configured to convert an electric signal processed by the mapping processing into an optical signal; an optical path unit configured to transmit the optical signal generated by the optical transmission unit; and an optical reception unit including an optical signal detection unit, which is configured to detect the optical signal transmitted from the optical path unit and convert the detected optical signal into an electric signal, and a de-mapping unit, which is configured to perform, on the electric signal, de-mapping processing for conversion into the information of one unit of one system, or one unit of each of a plurality of systems, by selecting high-likelihood bit information in association with the mapping processing in which the information is mapped in the pattern of Stokes vectors orthogonal between the slots of the multi-time slot.

Advantageous Effects of Invention

According to the optical transmission method of the present invention, mapping processing is executed so that information of one unit of one system, or one unit of each of a plurality of systems, is mapped in the pattern of two or more Stokes vectors orthogonal between slots of a multi-time slot, and de-mapping processing for conversion into the information of one unit of one system, or one unit of each of a plurality of systems, is executed on the reception side by selecting high-likelihood bit information in association with the mapping processing in which the information is mapped in the pattern of Stokes vectors orthogonal between the slots of the multi-time slot. The optical transmission method accordingly has an advantageous effect in that optical transmission enhanced in resistance against the polarization-dependent deterioration phenomena is accomplished with simple signal processing and a simple hardware configuration.

DESCRIPTION OF EMBODIMENTS

Optical transmission methods and optical transmission systems according to embodiments of the present invention are described in detail below with reference to the accompanying drawings. The embodiments are not to limit the present invention.

First Embodiment

Figure 1:
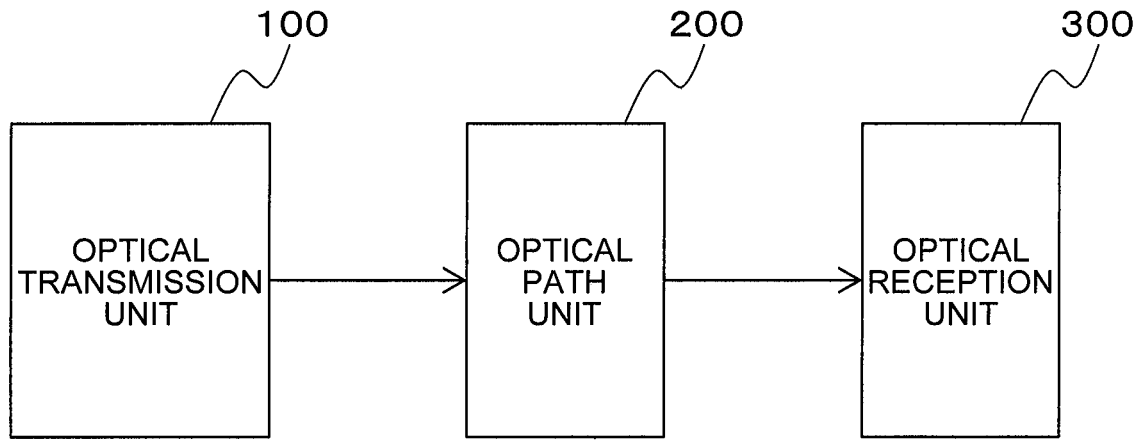
FIG. 1 is a block diagram for illustrating a configuration example of an optical transmission system that uses an optical transmission method according to a first embodiment of the present invention.

FIG. 1 is a diagram for illustrating a configuration example of an optical transmission system that uses an optical transmission method according to a first embodiment of the present invention. An optical transmission system 1 includes an optical transmission unit 100, an optical path unit 200, which is a transmission path constructed from an optical fiber, an optical relay, and the like, and an optical reception unit 300. In the optical transmission system, the optical transmission unit 100 transmits an optical signal, which is then received by the optical reception unit 300 via the optical path unit 200.

Figure 2:
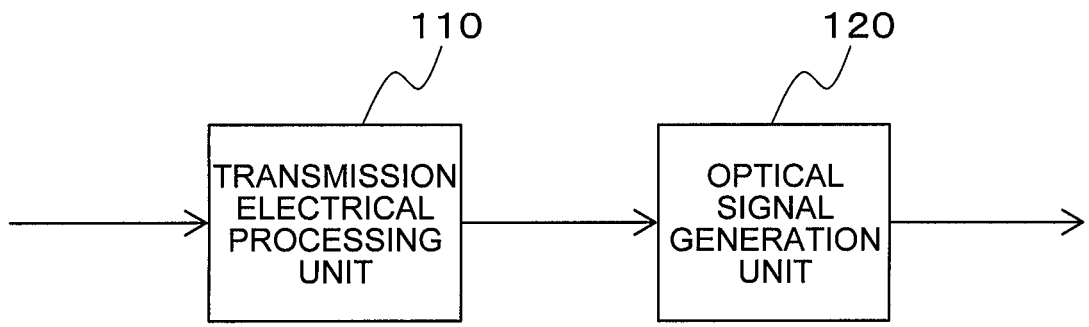
FIG. 2 is a block diagram for illustrating a configuration example of an optical transmission unit used in FIG. 1.

FIG. 2 is a diagram for illustrating a configuration example of the optical transmission unit 100 described above. The optical transmission unit 100 includes a transmission electrical processing unit 110 and an optical signal generation unit 120. The operation of each included unit is described as appropriate in a description given later on the operation of the optical transmission system 1.

Figure 3:
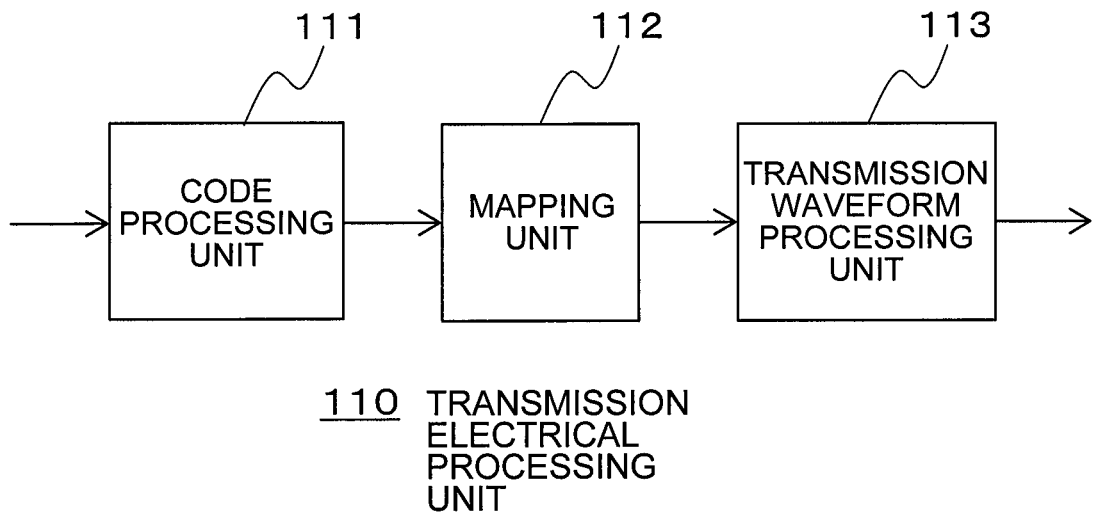
FIG. 3 is a block diagram for illustrating a configuration example of a transmission electrical processing unit used in FIG. 2.

FIG. 3 is a diagram for illustrating a configuration example of the transmission electrical processing unit 110 in the optical transmission unit 100 described above. The transmission electrical processing unit 110 includes a code processing unit 111, a mapping unit 112, and a transmission waveform processing unit 113. The operation of each included unit is described as appropriate in the description given later on the operation of the optical transmission system 1.

Figure 4:
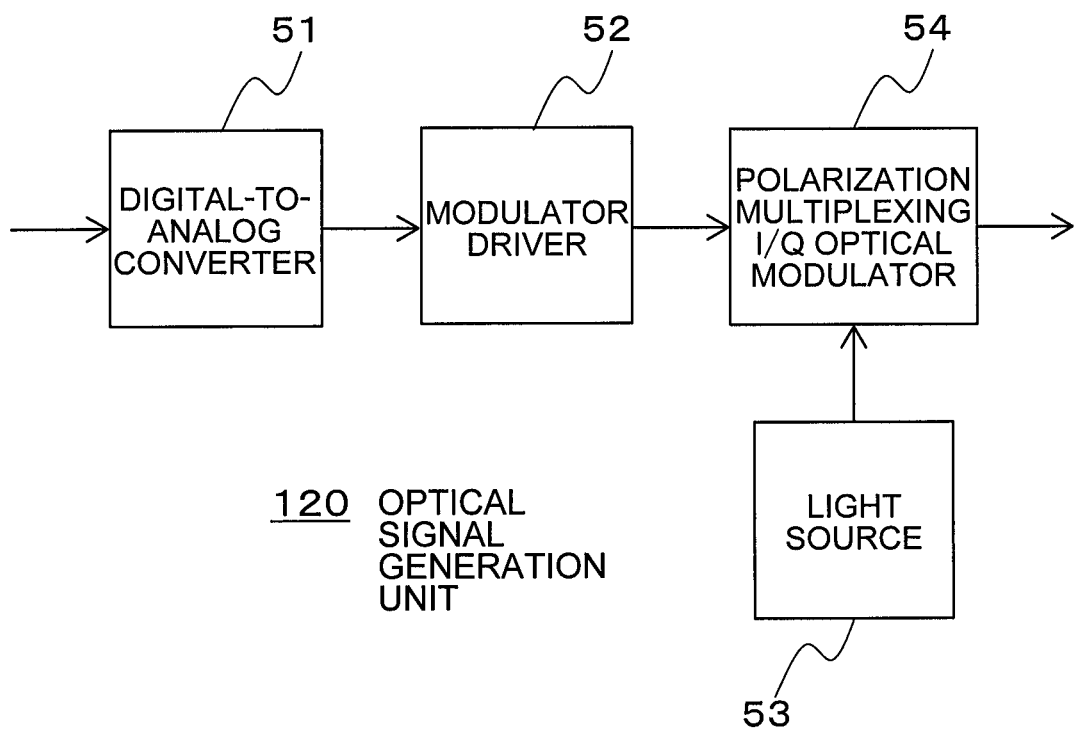
FIG. 4 is a block diagram for illustrating a configuration example of an optical signal generation unit used in FIG. 2.

FIG. 4 is a diagram for illustrating a configuration example of the optical signal generation unit 120 in the optical transmission unit 100 described above. The optical signal generation unit 120 includes a digital-to-analog converter 51, a modulator driver 52, a light source 53, and a polarization multiplexing I/Q optical modulator 54. The operation of each included unit is described as seen fit in the description given later on the operation of the optical transmission system 1.

Figure 5:
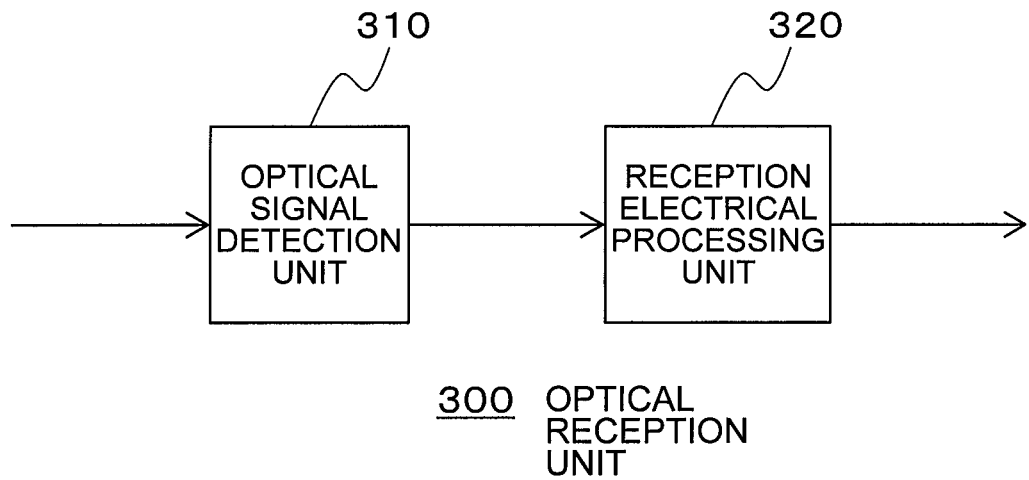
FIG. 5 is a block diagram for illustrating a configuration example of an optical reception unit used in FIG. 1.

FIG. 5 is a diagram for illustrating a configuration example of the optical reception unit 300 described above. The optical reception unit 300 includes an optical signal detection unit 310 and a reception electrical processing unit 320. The operation of each included unit is described as seen fit in the description given later on the operation of the optical transmission system 1.

Figure 6:
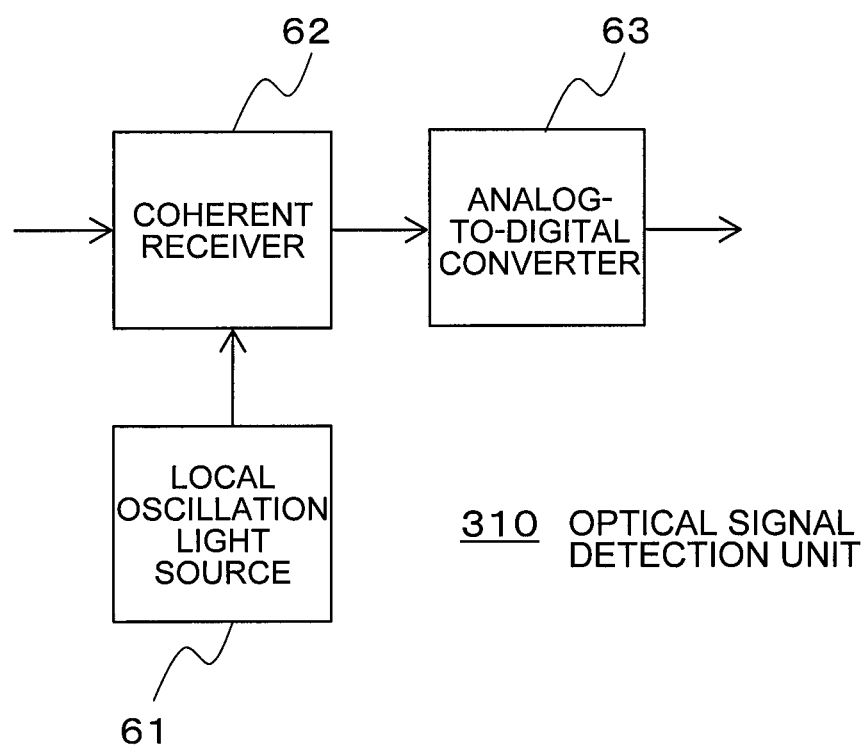
FIG. 6 is a block diagram for illustrating a configuration example of an optical signal detection unit used in FIG. 5.

FIG. 6 is a diagram for illustrating a configuration example of the optical signal detection unit 310 of the optical reception unit 300 described above. The optical signal detection unit 310 includes a local oscillation light source 61, a coherent receiver 62, and an analog-to-digital converter 63. The operation of each included unit is described as seen fit in the description given later on the operation of the optical transmission system 1.

Figure 7:
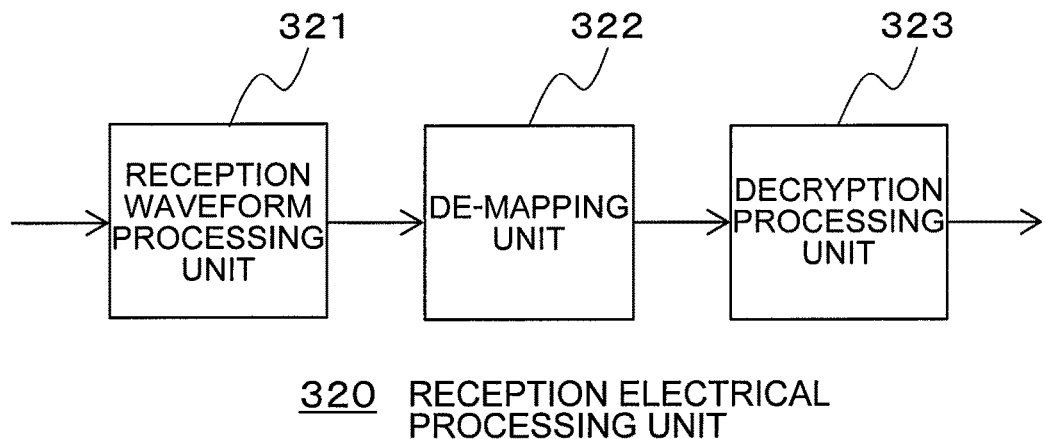
FIG. 7 is a block diagram for illustrating a configuration example of a reception electrical processing unit used in FIG. 5.

FIG. 7 is a diagram for illustrating a configuration example of the reception electrical processing unit 320 of the optical reception unit 300 described above. The reception electrical processing unit 320 includes a reception waveform processing unit 321, a de-mapping unit 322, and a decryption processing unit 323. The operation of each included unit is described as seen fit in the description given later on the operation of the optical transmission system 1.

Figure 8:
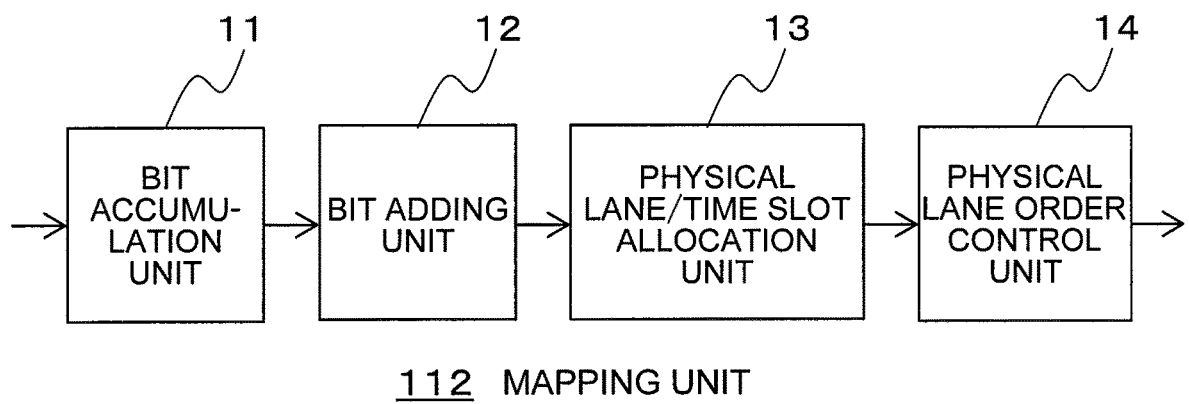
FIG. 8 is a block diagram for illustrating a configuration example of a mapping unit used in FIG. 3.

FIG. 8 is a diagram for illustrating an example of the internal configuration of the mapping unit 112 described above. The mapping unit 112 includes a bit accumulation unit 11, a bit adding unit 12, a physical lane/time slot allocation unit 13, and a physical lane order control unit 14. The operation of each included unit is described as seen fit in the description given later on the operation of the optical transmission system 1.

Figure 9:
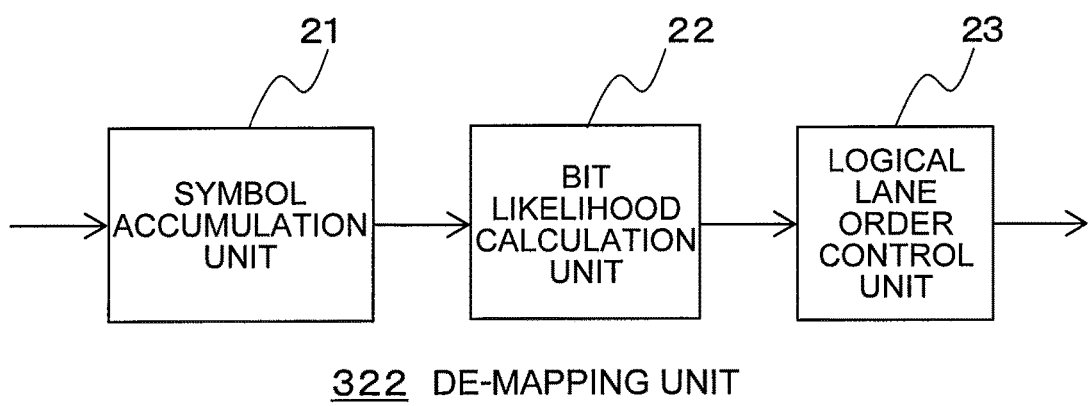
FIG. 9 is a block diagram for illustrating a configuration example of a de-mapping unit used in FIG. 7.

FIG. 9 is a diagram for illustrating an example of the internal configuration of the de-mapping unit 322 described above. The de-mapping unit 322 includes a symbol accumulation unit 21, a bit likelihood calculation unit 22, and a logical lane order control unit 23. The operation of each included unit is described as appropriate in the description given later on the operation of the optical transmission system 1.

Figure 10:
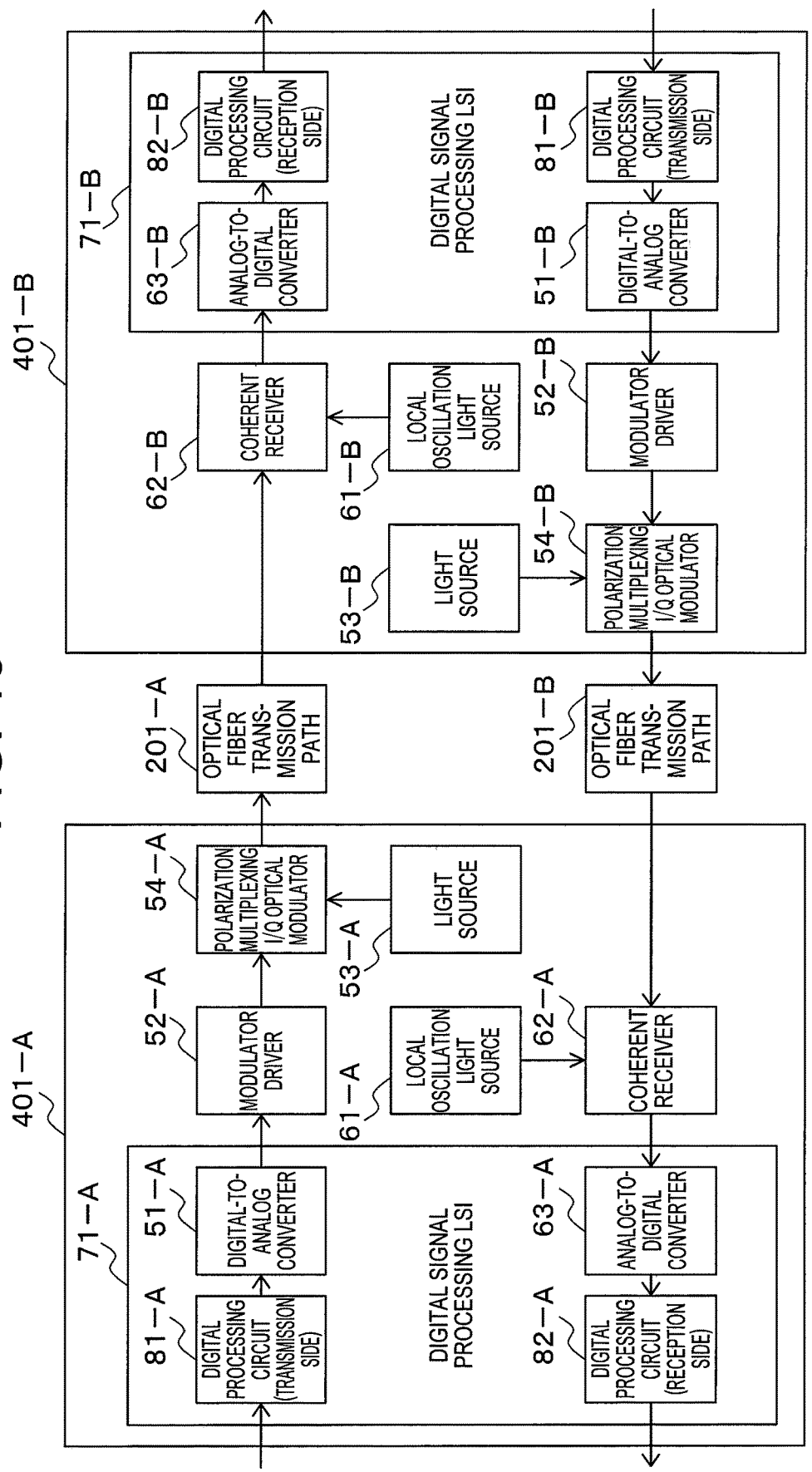
FIG. 10 is a block diagram for illustrating an example of the overall configuration of an optical transmission system according to the first to fourth embodiments of the present invention.

FIG. 10 is a diagram for illustrating an example of the overall configuration of the optical transmission system according to the first embodiment, which is described above, and second to fourth embodiments, which are described later.

In this example, an optical transmitter/receiver 401-A and an optical transmitter/receiver 401-B hold two-way communication over optical fiber transmission paths 201-A and 201-B. Components related to the optical transmitter/receiver 401-A are denoted by symbols hyphenated with "A" in the drawings, and physical components related to the optical transmitter/receiver 401-B are denoted by symbols hyphenated with "B" in the drawings.

The configurations described above and illustrated in FIG. 1 to FIG. 7 are presented below once more, and their differences are described as well.

The transmission electrical processing unit 110 illustrated in FIG. 2, and the code processing unit 111, the mapping unit 112, and the transmission waveform processing unit 113, which are internal functions of the transmission electrical processing unit 110 and which are illustrated in FIG. 3, are installed as a logical circuit inside a digital signal processing LSI-71. The logical circuit is illustrated as one of digital signal processing circuits (the transmission side) in FIG. 10.

The digital-to-analog converter 51, which is an internal function of the optical signal generation unit 120 illustrated in FIG. 2 and which is illustrated in FIG. 4, is installed as an analog-digital mixed circuit inside the digital signal processing LSI-71.

The digital-to-analog converter 63, which is an internal function of the optical signal detection unit 310 illustrated in FIG. 5 and which is illustrated in FIG. 6, is installed as an analog-digital mixed circuit inside the digital signal processing LSI-71.

The reception electrical processing unit 320 illustrated in FIG. 5, and the reception waveform processing unit 321, the de-mapping unit 322, and the decryption processing unit 323, which are internal functions of the reception electrical processing unit 320 and which are illustrated in FIG. 7, are installed as a logical circuit inside a digital signal processing LSI-71. The logical circuit is illustrated as one of digital signal processing circuits 82 (the reception side).

Figure 11:
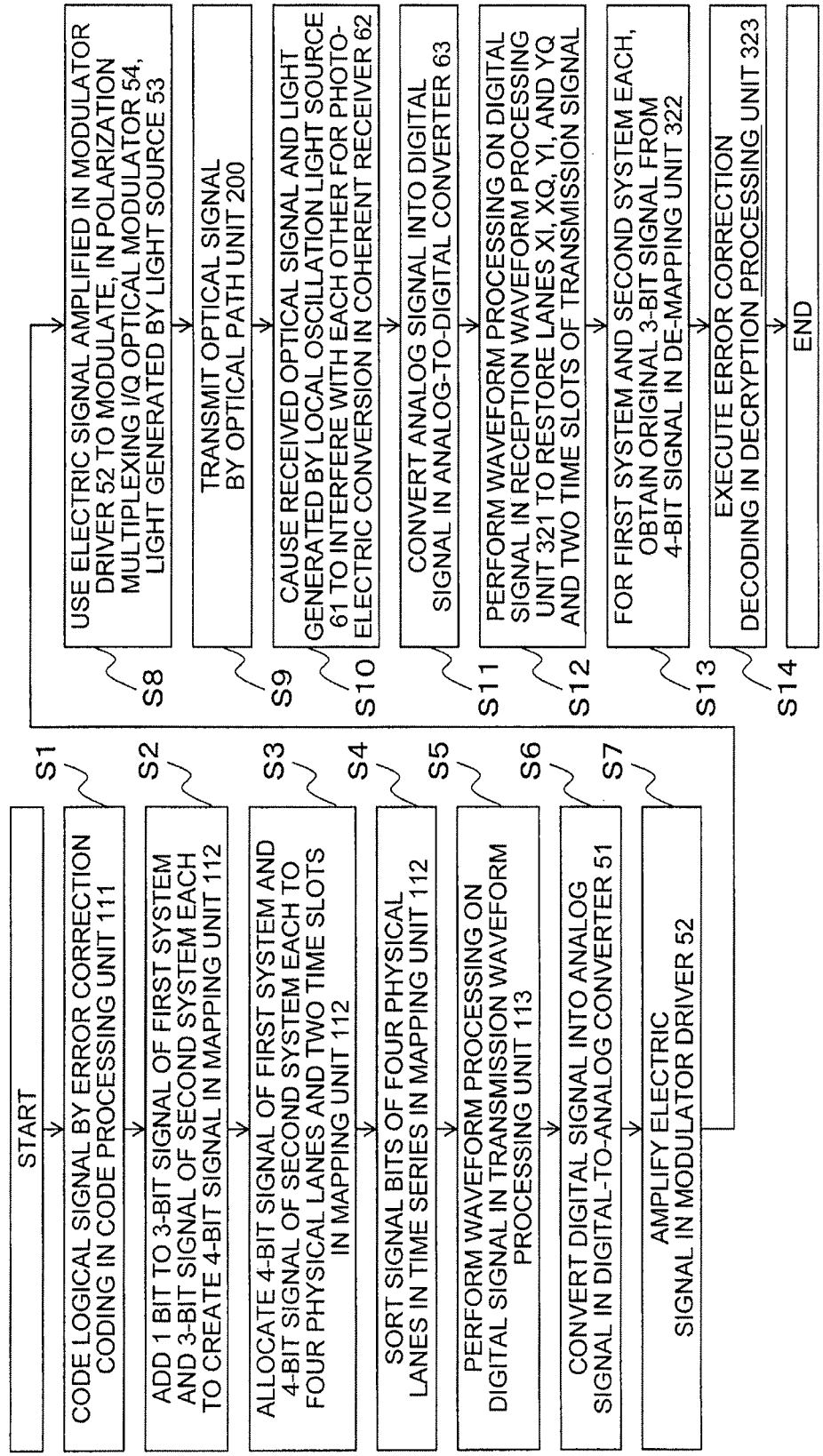
FIG. 11 is a flow chart for illustrating an example of overall processing of the optical transmission method and optical transmission system according to the first to third embodiments of the present invention.

FIG. 11 is a diagram for organizing, in the form of a flow chart, the flow of processing in the optical transmission method according to the first embodiment, which is described above, and optical transmission methods according to the second and third embodiments, which are described later.

A description is given next with reference to the configuration example of FIG. 10 and the flow chart of FIG. 11 on the operation of the optical transmission system 1 illustrated in FIG. 1 in which an optical signal is transmitted from the optical transmission unit 100 and is received by the optical reception unit 300 via the optical path unit 200.

The optical transmission unit 100 performs processing described below on a logical signal input from the outside.

The code processing unit 111 of the transmission electrical processing unit 110 performs error correction coding on a logical signal that is a binary data signal input from the outside (Step S1). The code processing unit 111 outputs the logical signal coded by error correction coding to the mapping unit 112.

An example of the logical signal input to the code processing unit 111 is a data signal formatted into an Optical Transport Unit Level 4 (OTU4) frame. In the error correction coding, several frames of, for example, OTU4 frame signals are accumulated, interleave processing or the like in which arranged bits switch places is applied, a parity bit is calculated with the use of a low-density parity check code having a redundancy level of 25%, 50%, or so, and the calculated parity bit is attached.

The mapping unit 112 illustrated in FIG. 3 processes the logical signal coded by error correction coding in units of 6 bits. The 6 bits are made up of 3-bit signals of two systems.

In the mapping unit 112, the bit accumulation unit 11 accumulates 6 bits.

The bit accumulation method can be changed by request from the outside (not shown).

The bit adding unit 12 processes bits b0, b1, and b2 in a 3-bit signal of a first system out of the two systems by generating 1 bit from the exclusive OR of the 3 bits to obtain a signal bit b3 for the fourth bit (Step S2). This is equivalent to single-parity check coding, and a number for logic "1" out of the above-mentioned bits b0, b1, b2, and b3 in the 4-bit signal of the first system is an even number. Bits b4, b5, and b6 in a 3-bit signal of a second system out of the two systems, on the other hand, are processed by generating 1 bit from the inverted exclusive OR of those three bits to obtain a signal bit b7 for the fourth bit (Step S2). A number for logic "1" out of the above-mentioned bits b4, b5, b6, and b7 in the 4-bit signal of the second system is an odd number. The 4-bit signals b0 to b7 of the two systems are generated in this manner.

The bit addition method, too, can be changed by request from the outside (not shown).

The physical lane/time slot allocation unit 13 allocates, out of the bits in the 4-bit signal of the first system, the bit b0 to an X-polarized wave out of waves of quadrature dual polarization, the I-axis out of axes of quadrature binary phase, and an XI1 lane, which is Time Slot 1 out of two consecutive time slots; the bit b1 to the X-polarized wave out of the waves of quadrature dual polarization, the Q-axis out of the axes of quadrature binary phase, and an XQ1 lane, which is Time Slot 1 out of two consecutive time slots; the bit b2 to a Y-polarized wave out of the waves of quadrature dual polarization, the I-axis out of the axes of quadrature binary phase, and a YI2 lane, which is Time Slot 2 out of two consecutive time slots; and the bit b3 to the Y-polarized wave out of the waves of quadrature dual polarization, the Q-axis out of the axes of quadrature binary phase, and a YQ2 lane, which is Time Slot 2 out of two consecutive time slots (Step S3).

The physical lane/time slot allocation unit 13 allocates, out of the bits in the 4-bit signal of the second system, the bit b4 to the Y-polarized wave out of the waves of quadrature dual polarization, the I-axis out of the axes of quadrature binary phase, and an YI1 lane, which is Time Slot 1 out of two consecutive time slots; the bit b5 to the Y-polarized wave out of the waves of quadrature dual polarization, the Q-axis out of the axes of quadrature binary phase, and a YQ1 lane, which is Time Slot 1 out of two consecutive time slots; the bit b6 to the X-polarized wave out of the waves of quadrature dual polarization, the I-axis out of the axes of quadrature binary phase, and an XI2 lane, which is Time Slot 2 out of two consecutive time slots; and the bit b7 to the X-polarized wave out of the waves of quadrature dual polarization, the Q-axis out of the axes of quadrature binary phase, and an XQ2 lane, which is Time Slot 2 out of two consecutive time slots (Step S3).

The physical lane/time slot allocation method, too, can be changed by request from the outside (not shown).

After the mapping to XI1, XQ1, YI1, YQ1, XI2, XQ2, YI2, and YQ2 is executed in the physical lane/time slot allocation unit 13 in the manner described above, the physical lane order control unit 14 sorts two time slots of signal in time series, and outputs signals of the four lanes, XI, XQ, YI, and YQ to the transmission waveform processing unit 113 (Step S4).

Figure 12:
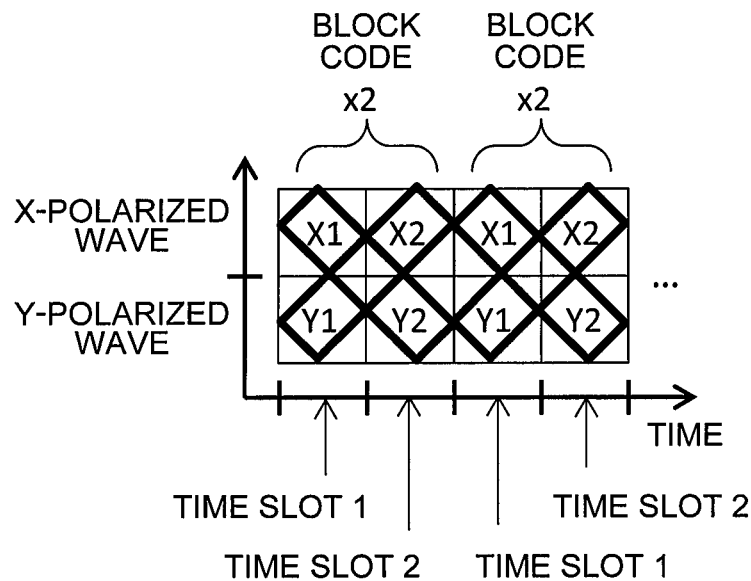
FIG. 12 is a diagram for illustrating a concept of mapping in the optical transmission method according to the first embodiment of the present invention.

A concept of the mapping processing described above is illustrated in FIG. 12. The execution of two time slots of three-bit, four-dimensional coded modulation in combination is quasi-equivalent to the execution of six-bit, eight-dimensional modulation. An electric signal generated in this manner is converted into an optical signal by subsequent processing. Signal points are elements of a complementary set of a polarization multiplexed QPSK signal.

Figure 13:
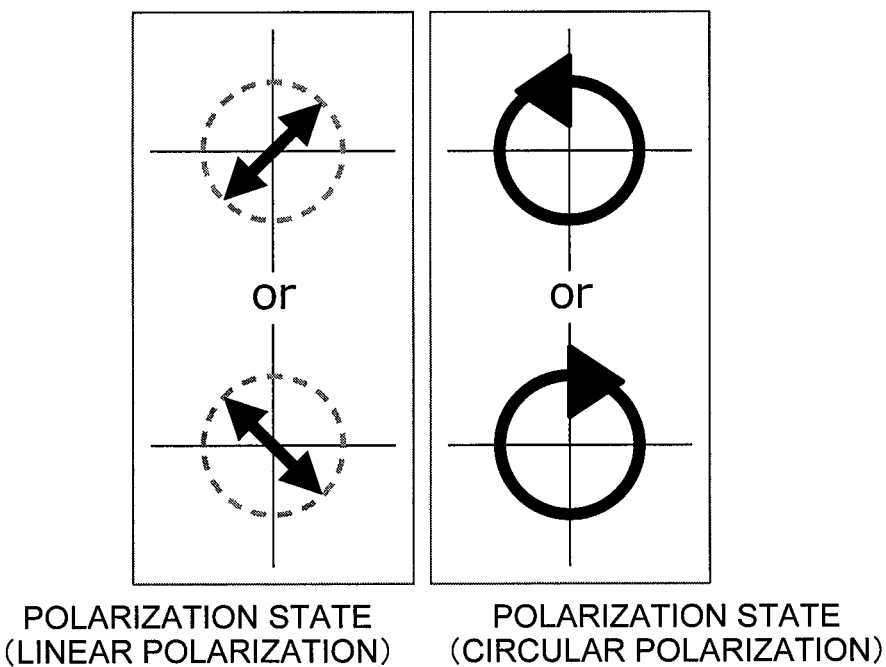
FIG. 13 is a diagram for illustrating a concept of the polarization state of an optical signal that is generated by the optical transmission method according to the first embodiment of the present invention.

A concept of polarized waves of the generated optical signal is illustrated in FIG. 13. The polarization state in one of two consecutive time slots is linear polarization and the polarization state in the other of the two consecutive time slots is circular polarization. The frequency utilization efficiency is 3 bits/symbol.

For comparison, a brief description is given on mapping and polarization states in the PS-QPSK method of the related art described in Non-Patent Literature 3 described above.

Figure 14:
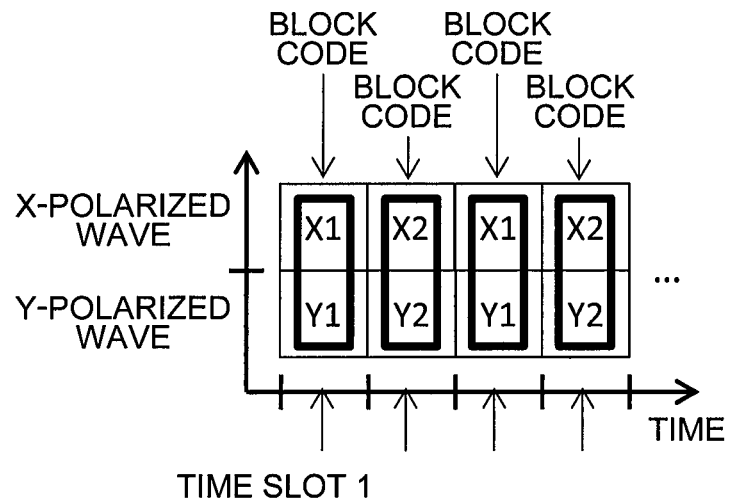
FIG. 14 is a diagram for illustrating a concept of a mapping method in PS-QPSK, which is the related art described in Non-Patent Literature 3.

A concept of mapping in this PS-QPSK is illustrated in FIG. 14. A signal is coded by three-bit, four-dimensional coding within one time slot in an enclosed manner. For example, 3-bit information is processed by generating, as parity, the fourth bit from the exclusive OR of the three information bits, and the four information bits are allocated to four physical lanes, XI, XQ, YI, and YQ.

The four lanes are illustrated as portions each enclosed by a bold line (the same applies to examples given below). In the case of a first time slot, which includes the four lanes, for example, X1 is made up of XI1 and XQ1, and Y1 is made up of YI1 and YQ1. The frequency utilization ratio in this case is 3 bits/symbol as in the method according to the embodiment described above.

Figure 15:
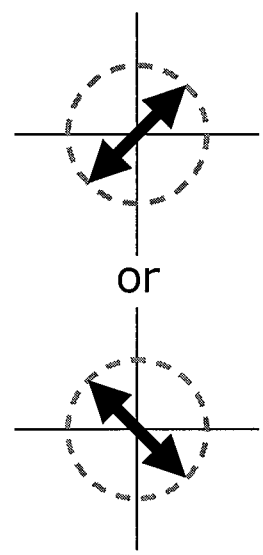
FIG. 15 is a diagram for illustrating a concept of the polarization state in PS-QPSK, which is the related art described in Non-Patent Literature 3.

A concept of the polarization state in this case is illustrated in FIG. 15. Any one of two linearly polarized waves in an orthogonal relation is chosen depending on the information bit. This means that a particular polarization state is kept chosen for some bit series, which lowers resistance against the polarization-dependent deterioration phenomena. The polarization state illustrated on the upper side of FIG. 15 (a linearly polarized wave slanted at an angle of ±45 degrees) is expressed as the polarization state on a Stokes vector S2 on the Poincaré sphere.

In the first embodiment, on the other hand, mapping processing in which a signal is mapped in the pattern of two orthogonal Stokes vectors is executed by combining two time slots of coded modulation of a three-bit, four-dimensional signal (the signal bits b0 to b3, the signal bits b4 to b7). Two polarization states on the left-hand side of FIG. 13 are points on the Stokes vector S2 (as in FIG. 15). Two polarization states on the right-hand side of FIG. 13 (counter-clockwise circular polarization and clockwise circular polarization) are expressed as polarization states on a Stokes vector S3 on the Poincaré sphere. The Stokes vector S2 and the Stokes vector S3 are in an orthogonal relation on the Poincaré sphere (other than this, horizontal linear polarization and vertical linear polarization are expressed as polarization states on a Stokes vector S1 on the Poincaré sphere).

The polarization state changes in this manner, which enhances resistance against the polarization-dependent deterioration phenomena.

Time slots are not required to be adjacent to each other, and the number of time slots is not limited to two as well.

Referring back to FIG. 3, which is a diagram for illustrating the first embodiment, the transmission waveform processing unit 113 performs signal spectrum shaping and other types of processing on the mapped 4-lane signal input from the mapping unit 112, and outputs the 4-lane signal of the four lanes, XI, XQ, YI, and YQ to the optical signal generation unit 120 (Step S5). The optical signal generation unit 120 generates an optical signal from the 4-lane signal input from the transmission waveform processing unit 113 of the transmission electrical processing unit 110, and outputs the optical signal to the optical path unit 200.

A more detailed description on the operation of the optical signal generation unit 120 is given with reference to FIG. 4.

The digital-to-analog converter 51 of the optical signal generation unit 120 performs digital-to-analog conversion on the 4-lane signal (digital signal) input from the transmission waveform processing unit 113 of the transmission electrical processing unit 110, and outputs the analog signal created by the conversion to the modulator driver 52 (Step S6).

When the digital signal input from the transmission waveform processing unit 113 of the transmission electrical processing unit 110 is made up of signal bits of the four lanes, the XI lane, the XQ lane, the YI lane, and the YQ lane, for example, the digital-to-analog converter 51 executes digital-to-analog conversion for each of the four lanes. The digital-to-analog converter 51 outputs the analog signal of the four lanes to the modulator driver 52.

The modulator driver 52 amplifies the analog signal input from the digital-to-analog converter 51, and outputs the amplified analog signal to the polarization multiplexing I/Q optical modulator 54 (Step S7). When the analog signal input from the digital-to-analog converter 51 is made up of signal bits of four lanes, namely, an XI-lane signal bit, an XQ-lane signal bit, a YI-lane signal bit, and a YQ-lane signal bit, for example, the modulator driver 52 executes amplification processing for each of the four lanes. The modulator driver 52 outputs the amplified 4-lane analog signal to the polarization multiplexing I/Q optical modulator 54.

The light source 53 generates, for example, C-band light having an ITU-T grid wavelength (ITU-T stands for International Telecommunication Union Telecommunication Standardization Sector), namely, C-band unmodulated light compliant with ITU-T G694.1 and having a wavelength of 1,530 nm to 1,565 nm. The generated light is output to the polarization multiplexing I/Q optical modulator 54.

The polarization multiplexing I/Q optical modulator 54 modulates the unmodulated light input from the light source 53 with the amplified analog electric signal input from the modulator driver 52, and outputs the resultant signal to the optical path unit 200 (Step S8).

The optical path unit 200 transmits the optical signal input from the polarization multiplexing I/Q optical modulator 54 of the optical signal generation unit 120 in the optical transmission unit 100 to output the optical signal to the light reception unit 300 (Step S9). A possible configuration of the optical path unit 200 may include, for example, an optical multiplexer/demultiplexer, an optical amplifier for loss compensation, and an optical fiber for wavelength dispersion compensation, which are constructed from a wavelength selective switch (WSS), an arrayed waveguide grating (AWG), an interleaver, an optical coupler, and the like, in addition to the transmission path fiber.

The optical signal detection unit 310 in the optical reception unit 300 illustrated in FIG. 5 detects the optical signal input from the optical path unit 200, converts the optical signal into an electric digital signal, and outputs the electric digital signal to the reception electrical processing unit 320. In the optical signal detection unit 310, the local oscillation light source 61 generates, for example, C-band unmodulated light having an ITU-T grid wavelength, and outputs the generated light to the coherent receiver 62, which is a polarization diversity-type integrated coherent receiver, as illustrated in FIG. 6. The wavelength of the unmodulated light generated by the oscillation of the local oscillation light source 61 is required to roughly match the wavelength of a carrier wave, or a sub-carrier wave, of the optical signal input from the optical path unit 200 to the coherent receiver 62.

The coherent receiver 62 causes the optical signal input from the optical path unit 200 and the unmodulated light input from the local oscillation light source 61 to mix and interfere with each other, detects the resultant wave, converts the wave into an electric signal, and outputs the electric signal to the analog-to-digital converter 63 (Step S10).

The coherent receiver 62 detects the reception signal by dividing the signal into four lanes, namely, an X'-polarized wave I'-axis component, an X'-polarized wave Q'-axis component, a Y'-polarized wave I'-axis component, and a Y'-polarized wave Q'-axis component, with the local oscillation light as reference. Each of the components of the 4-lane optical signal is converted into an electric signal component, and is output after amplified to an amplitude required for processing downstream of this step. The prime symbol "'" is attached in each of "X'", "Y'", "I'", and "Q'" in order to indicate that quadrature dual polarization components and quadrature binary phase components obtained from the received optical signal in the light reception unit 300 are not always the same as the quadrature dual polarization components and quadrature binary phase components of the respective lanes generated in the light transmission unit 100.

The analog-to-digital converter 63 performs analog-to-digital conversion on the electric signal components input from the coherent receiver 62, and outputs the digital signal components to the reception electrical processing unit 320 (Step S11). The analog-to-digital conversion is processed in each of the four lanes, X'I', X'Q', Y'I', and Y'Q', separately.

The reception waveform processing unit 321 in the reception electrical processing unit 320 processes the electric signal components (digital signal components) input from the analog-to-digital converter 63 in the optical signal detection unit 310 by compensation, restores signal components of the XI lane, XQ lane, YI lane, YQ lane, and two consecutive time slots of the transmission signal, and outputs the signal components to the de-mapping unit 322 as illustrated in FIG. 7 (Step S12). The compensation is made for: a physical delay difference caused among the optical signal generation unit 120 in the optical transmission unit 100, the optical path unit 200, and the optical signal detection unit 310 in the optical reception unit 300; wavelength dispersion; band narrowing and other waveform distortions; polarization mode dispersion; a change in polarization state; symbol timing misalignment; and differences in optical frequency and in optical phase between a carrier wave, or a sub-carrier wave, and local oscillation light. Signal points of the restored signal are elements of a complementary set of the polarization multiplexed QPSK signal.

The mapping unit 322 illustrated in FIG. 7 executes de-mapping based on signal components XI1, XQ1, YI1, YQ1, XI2, XQ2, YI2, and YQ2, which are the signal components of the four lanes and two time slots input from the reception waveform processing unit 321.

The two time slots of 4-lane signals are accumulated by the symbol accumulation unit 21 illustrated in FIG. 9 to be used in processing downstream of this step. The symbol accumulation method can be changed by request from the outside (not shown).

The bit likelihood calculation unit 22 restores the original bits from the eight-dimensional signal made up of two time slots of 4-lane signals. Of the eight-dimensional signal, four lanes XI1, XQ1, YI2, and YQ2 (corresponding to portions enclosed by bold lines and stretching from upper left to lower right between Time Slot 1 and Time Slot 2 in FIG. 12) are four dimensions of the first system, and carry three bits (b0, b1, and b2) of information. A likely combination of three bits is selected from 8 (2 cubed) combinations. Soft decision in which reliability information is given may be used in combination. Four lanes YI1, YQ1, XI2, and XQ2 (corresponding to portions enclosed by bold lines and stretching from upper right to lower left between Time Slot 1 and Time Slot 2 in FIG. 12) are four dimensions of the second system, and carry three bits (b4, b5, and b6) of information. A likely combination of three bits is similarly selected from 8 combinations (Step S13). This, too, may be executed in combination with soft decision in which reliability information is given.

Methods commonly used in error correction decoding processing, such as Max-Log-MAP and min-sum, can be applied to the de-mapping processing of the two systems.

The bit likelihood calculation method can be changed by request from the outside (not shown).

The logical lane order control unit 23 performs order control on six bits (b0, b1, b2, b4, b5, and b6) of information in total obtained through the processing in the bit likelihood calculation unit 22, plus reliability information about the reliability of the six bits of information in some cases, so that the consistency with the coding in the code processing unit 111 illustrated in FIG. 3 is established, and outputs the information to the decryption processing unit 323. The logical lane order control method can be changed by request from the outside (not shown).

The decryption processing unit 323 performs error correction decoding on the de-mapped information input from the de-mapping unit 322 (Step S14).

The error correction decoding includes, for example, the accumulation of several frames of OTU4 frame signals, de-interleave processing in which the bits are returned to the original bit arrangement so as to correspond to the error correction coding executed in the code processing unit 111, decryption processing following code rules of low-density parity check codes, and the outputting of the decoded signal to the outside (not shown).

According to the first embodiment, the polarization state in one of two consecutive time slots can be set to linear polarization while the polarization state in the other of the two consecutive time slots is set to circular polarization (see FIG. 13) as described above, resistance against the polarization-dependent deterioration phenomena (occurs mainly in the optical path unit 200) can consequently be enhanced. Even when the polarization state changes relatively depending on the optical system inside the optical transmission unit 100, the optical path unit 200, and the optical reception unit 300, a polarization change occurs around 100 kHz at the earliest in the case of, for example, a 30-Gbaud signal, and it can therefore be said that the polarization state is generally stable in a time period equivalent to 1,000 symbols or so.

In Patent Literature 1 cited above, 6-bit, 8-dimensional modulation is required to accomplish the same frequency utilization efficiency as in the first embodiment, which is 3 bits/symbol (per two polarized waves), and 64 (2 to the sixth power) combinations are required to be searched in de-mapping, thereby making the de-mapping-related calculation load relatively heavy.

In contrast, the code rule to be observed in the first embodiment is 3-bit, 4-dimensional modulation at most, and it is accordingly sufficient for the de-mapping unit 322 in the light reception unit 300 to execute search processing in which only eight combinations for each system are searched, thereby making de-mapping-related calculation load light. This provides another advantageous effect in that circuits can be installed efficiently.

Second Embodiment

Figure 16:
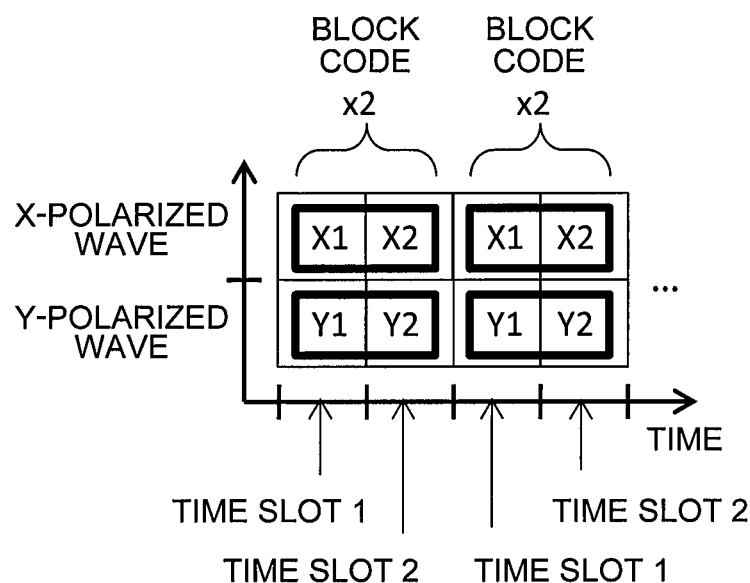
FIG. 16 is a diagram for illustrating a concept of mapping in an optical transmission method according to the second embodiment of the present invention.

FIG. 16 is a diagram for illustrating a concept of mapping by the optical transmission method according to the second embodiment of the present invention. The second embodiment is the same as the first embodiment in the configuration of the optical transmission system, but differs in the operation of the mapping unit 112 in the transmission electrical processing unit 110 in the optical transmission unit 100 and the operation of the de-mapping unit 322 in the reception electrical processing unit 320 in the optical reception unit 300.

The mapping unit 112 handles a logical signal coded by error correction coding in units of 6 bits, as 3-bit signals of two systems. The bit accumulation unit 11 in the mapping unit 112 accumulates 6 bits.

The bit accumulation method can be changed by request from the outside (not shown).

The bit adding unit 12 in the mapping unit 112 processes the bits b0, b1, and b2 in a 3-bit signal of the first system out of the two systems by generating 1 bit from the exclusive OR of the 3 bits to obtain the signal bit b3 for the fourth bit. This is equivalent to single-parity check coding, and a number for logic "1" out of the bits b0, b1, b2, and b3 in the 4-bit signal of the first system is an even number.

The bits b4, b5, and b6 in a 3-bit signal of the second system, on the other hand, are processed by generating 1 bit from the inverted exclusive OR of those three bits to obtain the signal bit b7 for the fourth bit. A number for logic "1" out of the bits b4, b5, b6, and b7 in the 4-bit signal of the second system is an odd number. The 4-bit signals b0 to b7 of the two systems are generated in this manner. The bit addition method, too, can be changed by request from the outside (not shown). The second embodiment is the same as the first embodiment up through this point.

The physical lane/time slot allocation unit 13 in the mapping unit 112 allocates, out of the bits in the 4-bit signal of the first system, the bit b0 to an X-polarized wave out of waves of quadrature dual polarization, the I-axis out of axes of quadrature binary phase, and an XI1 lane, which is Time Slot 1 out of two consecutive time slots; the bit b1 to the X-polarized wave out of the waves of quadrature dual polarization, the Q-axis out of the axes of quadrature binary phase, and an XQ1 lane, which is Time Slot 1 out of two consecutive time slots; the bit b2 to a X-polarized wave out of the waves of quadrature dual polarization, the I-axis out of the axes of quadrature binary phase, and a XI2 lane, which is Time Slot 2 out of two consecutive time slots; and the bit b3 to the X-polarized wave out of the waves of quadrature dual polarization, the Q-axis out of the axes of quadrature binary phase, and a XQ2 lane, which is Time Slot 2 out of two consecutive time slots.

The physical lane/time slot allocation unit 13 allocates, out of the bits in the 4-bit signal of the second system, the bit b4 to the Y-polarized wave out of the waves of quadrature dual polarization, the I-axis out of the axes of quadrature binary phase, and an XI1 lane, which is Time Slot 1 out of two consecutive time slots; the bit b5 to the Y-polarized wave out of the waves of quadrature dual polarization, the Q-axis out of the axes of quadrature binary phase, and a YQ1 lane, which is Time Slot 1 out of two consecutive time slots; the bit b6 to the Y-polarized wave out of the waves of quadrature dual polarization, the I-axis out of the axes of quadrature binary phase, and an YI2 lane, which is Time Slot 2 out of two consecutive time slots; and the bit b7 to the Y-polarized wave out of the waves of quadrature dual polarization, the Q-axis out of the axes of quadrature binary phase, and an YQ2 lane, which is Time Slot 2 out of two consecutive time slots.

The physical lane/time slot allocation method, too, can be changed by request from the outside (not shown).

After the mapping to XI1, XQ1, YI1, YQ1, XI2, XQ2, YI2, and YQ2 is executed in the manner described above, the physical lane order control unit 14 sorts two time slots of signal in time series, and outputs signals of the four lanes, XI, XQ, YI, and YQ to the transmission waveform processing unit 113.

As described above, the execution of two three-bit, four-dimensional coded modulations in combination is quasi-equivalent to the execution of six-bit, eight-dimensional modulation. An electric signal generated in this manner is converted into an optical signal by subsequent processing. Signal points are elements of a complementary set of a polarization multiplexed QPSK signal. A concept of polarized waves of the generated optical signal is the same as the one described in the first embodiment with reference to FIG. 13: the polarization state in one of two consecutive time slots is linear polarization and the polarization state in the other of the two consecutive time slots is circular polarization. The frequency utilization efficiency, too, is the same as in the first embodiment at 3 bits/symbol.

The de-mapping unit 322 executes de-mapping processing based on signal components XI1, XQ1, YI1, YQ1, XI2, XQ2, YI2, and YQ2, which are the signal components of the four lanes and two time slots input from the reception waveform processing unit 321. The two time slots of 4-lane signals are accumulated by the symbol accumulation unit 21 to be used in processing downstream of this step. The symbol accumulation method can be changed by request from the outside (not shown).

The bit likelihood calculation unit 22 restores the original bits from the eight-dimensional signal made up of two time slots of 4-lane signals. Of the eight-dimensional signal, four lanes XI1, XQ1, XI2, and XQ2 (corresponding to portions enclosed by bold lines on the upper side between Time Slot 1 and Time Slot 2 in FIG. 16) are four dimensions of the first system, and carry three bits (b0, b1, and b2) of information. A likely combination of three bits is selected from 8 (2 cubed) combinations. Soft decision in which reliability information is given may be used in combination. Four lanes YI1, YQ1, YI2, and YQ2 (corresponding to portions enclosed by bold lines on the lower side between Time Slot 1 and Time Slot 2 in FIG. 16) are four dimensions of the second system, and carry three bits (b4, b5, and b6) of information. A likely combination of three bits is similarly selected from 8 combinations. This, too, may be executed in combination with soft decision in which reliability information is given. Methods commonly used in error correction decoding processing, such as Max-Log-MAP and min-sum, can be applied to the de-mapping processing of the two systems. The bit likelihood calculation method can be changed by request from the outside (not shown).

The logical lane order control unit 23 performs order control on six bits (b0, b1, b2, b4, b5, and b6) of information in total obtained through the processing in the bit likelihood calculation unit 22, plus reliability information about the reliability of the six bits of information in some cases, so that the consistency with the coding in the code processing unit 111 is established, and outputs the information to the decryption processing unit 323.

Third Embodiment

Figure 17:
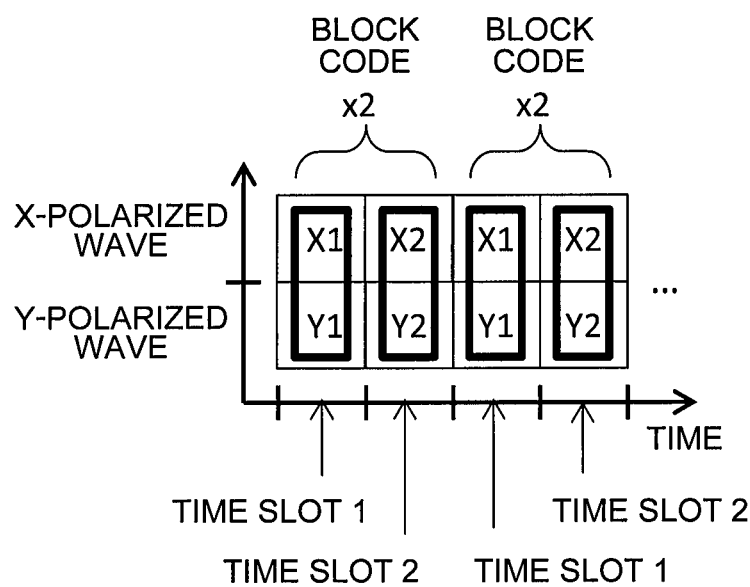
FIG. 17 is a diagram for illustrating a concept of mapping in an optical transmission method according to the third embodiment of the present invention.

FIG. 17 is a diagram for illustrating a concept of mapping by the optical transmission method according to the third embodiment of the present invention. The third embodiment is the same as the first embodiment in the configuration of the optical transmission system, but differs in the operation of the mapping unit 112 in the transmission electrical processing unit 110 in the optical transmission unit 100 and the operation of the de-mapping unit 322 in the reception electrical processing unit 320 in the optical reception unit 300.

The mapping unit 112 handles a logical signal coded by error correction coding in units of 6 bits, as 3-bit signals of two systems. The bit accumulation unit 11 in the mapping unit 112 accumulates 6 bits.

The bit accumulation method can be changed by request from the outside (not shown).

The bit adding unit 12 in the mapping unit 112 processes the bits b0, b1, and b2 in a 3-bit signal of the first system by generating 1 bit from the exclusive OR of the 3 bits to obtain the signal bit b3 for the fourth bit. This is equivalent to single-parity check coding, and a number for logic "1" out of the bits b0, b1, b2, and b3 in the 4-bit signal of the first system is an even number. The bits b4, b5, and b6 in a 3-bit signal of a second system, on the other hand, are processed by generating 1 bit from the inverted exclusive OR of these three bits to obtain the signal bit b7 for the fourth bit. A number for logic "1" out of the bits b4, b5, b6, and b7 in the 4-bit signal of the second system is an odd number. The 4-bit signals b0 to b7 of the two systems are generated in this manner. The bit addition method, too, can be changed by request from the outside (not shown). The third embodiment is the same as the first embodiment and the second embodiment up through this point.

The physical lane/time slot allocation unit 13 in the mapping unit 112 allocates, out of the bits in the 4-bit signal of the first system, the bit b0 to an X-polarized wave out of waves of quadrature dual polarization, the I-axis out of axes of quadrature binary phase, and an XI1 lane, which is Time Slot 1 out of two consecutive time slots; the bit b1 to the X-polarized wave out of the waves of quadrature dual polarization, the Q-axis out of the axes of quadrature binary phase, and an XQ1 lane, which is Time Slot 1 out of two consecutive time slots; the bit b2 to a Y-polarized wave out of the waves of quadrature dual polarization, the I-axis out of the axes of quadrature binary phase, and a YI1 lane, which is Time Slot 1 out of two consecutive time slots; and the bit b3 to the Y-polarized wave out of the waves of quadrature dual polarization, the Q-axis out of the axes of quadrature binary phase, and a YQ1 lane, which is Time Slot 1 out of two consecutive time slots. Here, four physical lanes (Xi, XQ, YI, and YQ) are combined with time slot numbers to be newly defined as lanes.

The physical lane/time slot allocation unit 13 allocates, out of the bits in the 4-bit signal of the second system, the bit b4 to the X-polarized wave out of the waves of quadrature dual polarization, the I-axis out of the axes of quadrature binary phase, and an XI2 lane, which is Time Slot 2 out of two consecutive time slots; the bit b5 to the X-polarized wave out of the waves of quadrature dual polarization, the Q-axis out of the axes of quadrature binary phase, and a XQ2 lane, which is Time Slot 2 out of two consecutive time slots; the bit b6 to the Y-polarized wave out of the waves of quadrature dual polarization, the I-axis out of the axes of quadrature binary phase, and an YI2 lane, which is Time Slot 2 out of two consecutive time slots; and the bit b7 to the Y-polarized wave out of the waves of quadrature dual polarization, the Q-axis out of the axes of quadrature binary phase, and an YQ2 lane, which is Time Slot 2 out of two consecutive time slots.

The physical lane/time slot allocation method, too, can be changed by request from the outside (not shown).

After the mapping to XI1, XQ1, YI1, YQ1, XI2, XQ2, YI2, and YQ2 is executed in the manner described above, the physical lane order control unit 14 sorts two time slots of signal in time series, and outputs signals of the four lanes, XI, XQ, YI, and YQ to the transmission waveform processing unit 113.

The execution of two three-bit, four-dimensional coded modulations in combination is quasi-equivalent to the execution of six-bit, eight-dimensional modulation. An electric signal generated in this manner is converted into an optical signal by subsequent processing. Signal points are elements of a complementary set of a polarization multiplexed QPSK signal. A concept of polarized waves of the generated optical signal is the same as the one described in the first embodiment and the second embodiment with reference to FIG. 13. The polarization state in one of two consecutive time slots is linear polarization and the polarization state in the other of the two consecutive time slots is circular polarization. The frequency utilization efficiency, too, is the same as in the first embodiment at 3 bits/symbol.

The de-mapping unit 322 executes de-mapping based on signal components XI1, XQ1, YI1, YQ1, XI2, XQ2, YI2, and YQ2, which are the signal components of the four lanes and two time slots input from the reception waveform processing unit 321. The two time slots of 4-lane signals are accumulated by the symbol accumulation unit 21 in the de-mapping unit 322 to be used in processing downstream of this step. The symbol accumulation method can be changed by request from the outside (not shown).

The bit likelihood calculation unit 22 in the de-mapping unit 322 restores the original bits from the eight-dimensional signal made up of two time slots of 4-lane signals. Of the eight-dimensional signal, four lanes XI1, XQ1, YI1, and YQ1 (corresponding to upper and lower portions enclosed by bold lines between the X-polarized wave and the Y-polarized wave in Time Slot 1 in FIG. 17) are four dimensions of the first system, and carry three bits (b0, b1, and b2) of information. A likely combination of three bits is selected from 8 (2 cubed) combinations. Soft decision in which reliability information is given may be used in combination. Four lanes XI2, XQ2, YI2, and YQ2 (corresponding to upper and lower portions enclosed by bold lines between the X-polarized wave and the Y-polarized wave in Time Slot 2 in FIG. 17) are four dimensions of the second system, and carry three bits (b4, b5, and b6) of information. A likely combination of three bits is similarly selected from 8 combinations. This, too, may be executed in combination with soft decision in which reliability information is given. Methods commonly used in error correction decoding processing, such as Max-Log-MAP and min-sum, can be applied to the de-mapping processing of the two systems. The bit likelihood calculation method can be changed by request from the outside (not shown).

The logical lane order control unit 23 in the de-mapping unit 322 performs order control on six bits (b0, b1, b2, b4, b5, and b6) of information in total obtained through the processing in the bit likelihood calculation unit 22, plus reliability information about the reliability of the six bits of information in some cases, so that the consistency with the coding in the code processing unit 111 is established, and outputs the information to the decryption processing unit 323.

Fourth Embodiment

Figure 18:
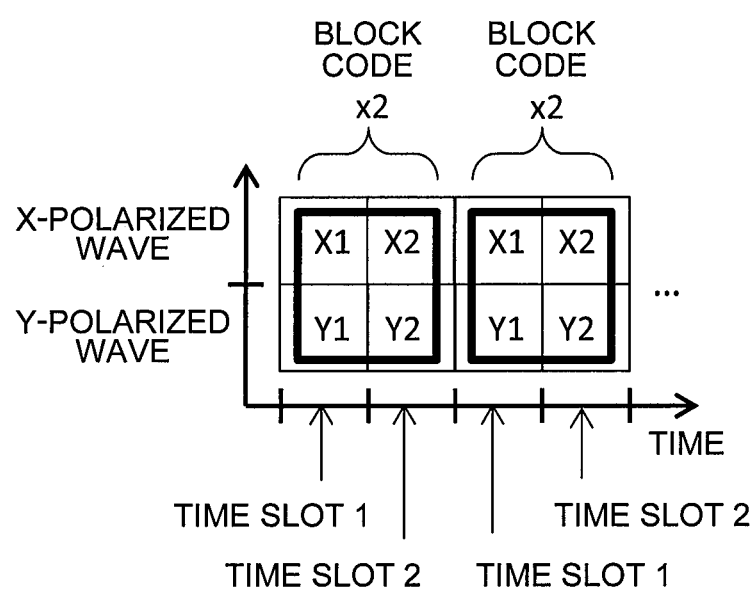
FIG. 18 is a diagram for illustrating a concept of mapping in an optical transmission method according to the fourth embodiment of the present invention.

FIG. 18 is a diagram for illustrating a concept of mapping by the optical transmission method according to the fourth embodiment of the present invention. The fourth embodiment is the same as the first embodiment in the configuration of the optical transmission system, but differs in the operation of the mapping unit 112 in the transmission electrical processing unit 110 in the optical transmission unit 100 and the operation of the de-mapping unit 322 in the reception electrical processing unit 320 in the optical reception unit 300.

Figure 19:
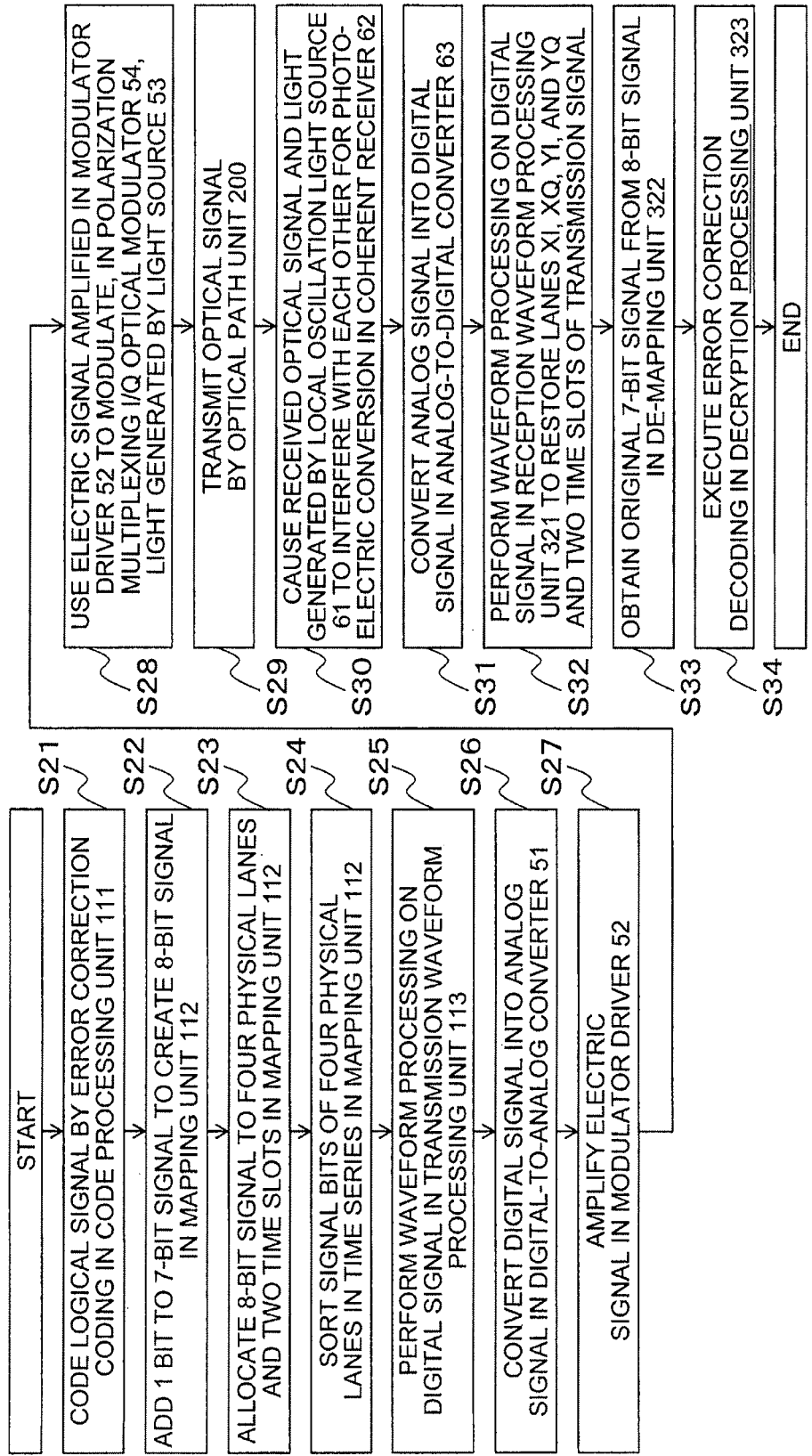
FIG. 19 is a flow chart for illustrating an example of overall processing of the optical transmission method according to the fourth embodiment of the present invention.

FIG. 19 is a flow chart in which the flow of processing of an optical transmission method according to the fourth embodiment of the present invention is organized. The following description is given with reference to the flow chart.

The mapping unit 112 handles a logical signal coded by error correction coding (Step S21) in units of 7 bits of one system. The bit accumulation unit 11 accumulates 7 bits. The bit accumulation method can be changed by request from the outside (not shown).

The bit adding unit 12 generates 1 bit from the inverted exclusive OR of the bits b0, b1, b2, b3, b4, b5, and b6 of the 7-bit signal to obtain a signal bit b7 for the eighth bit (Step S22). A number for logic "1" out of the bits b0 to b7 in the 8-bit signal is an odd number. The 8-bit signals b0 to b7 of the one system are generated in this manner. The bit addition method, too, can be changed by request from the outside (not shown).

The physical lane/time slot allocation unit 13 allocates, out of the bits in the 8-bit signal of the first system, the bit b0 to an X-polarized wave out of waves of quadrature dual polarization, the I-axis out of axes of quadrature binary phase, and an XI1 lane, which is Time Slot 1 out of two consecutive time slots; the bit b1 to the X-polarized wave out of the waves of quadrature dual polarization, the Q-axis out of the axes of quadrature binary phase, and an XQ1 lane, which is Time Slot 1 out of two consecutive time slots; the bit b2 to a Y-polarized wave out of the waves of quadrature dual polarization, the I-axis out of the axes of quadrature binary phase, and a YI1 lane, which is Time Slot 1 out of two consecutive time slots; and the bit b3 to the Y-polarized wave out of the waves of quadrature dual polarization, the Q-axis out of the axes of quadrature binary phase, and a YQ1 lane, which is Time Slot 1 out of two consecutive time slots; the bit b4 to the X-polarized wave out of the waves of quadrature dual polarization, the I-axis out of the axes of quadrature binary phase, and an XI2 lane, which is Time Slot 2 out of two consecutive time slots; the bit b5 to the X-polarized wave out of the waves of quadrature dual polarization, the Q-axis out of the axes of quadrature binary phase, and a XQ2 lane, which is Time Slot 2 out of two consecutive time slots; the bit b6 to the Y-polarized wave out of the waves of quadrature dual polarization, the I-axis out of the axes of quadrature binary phase, and an YI2 lane, which is Time Slot 2 out of two consecutive time slots; and the bit b7 to the Y-polarized wave out of the waves of quadrature dual polarization, the Q-axis out of the axes of quadrature binary phase, and an YQ2 lane, which is Time Slot 2 out of two consecutive time slots (Step S23). The signal bits correspond to upper and lower portions enclosed by bold lines between the X-polarized wave and the Y-polarized wave and between Time Slot 1 and Time Slot 2 in FIG. 18.

The physical lane/time slot allocation method, too, can be changed by request from the outside (not shown).

After the mapping to XI1, XQ1, YI1, YQ1, XI2, XQ2, YI2, and YQ2 is executed in the manner described above, the physical lane order control unit 14 sorts two time slots of signal in time series, and outputs signals of the four lanes, XI, XQ, YI, and YQ to the transmission waveform processing unit 113 (Step S24 and Step S25).

The optical transmission method according to the fourth embodiment is equivalent to 7-bit, 8-dimensional coded modulation. An electric signal generated in this manner is converted into an optical signal by subsequent processing, and the optical signal is transmitted (Step S26 to Step S29). Signal points are elements of a complementary set of a polarization multiplexed QPSK signal. A concept of polarized waves of the generated optical signal is the same as the one described in the first embodiment and the second embodiment with reference to FIG. 13: the polarization state in one of two consecutive time slots is linear polarization and the polarization state in the other of the two consecutive time slots is circular polarization. The frequency utilization efficiency is higher than in the first embodiment to the third embodiment at 3.5 bits/symbol.

The de-mapping unit 322 executes de-mapping based on signal components XI1, XQ1, YI1, YQ1, XI2, XQ2, YI2, and YQ2, which are the signal components of the four lanes and two time slots input from the reception waveform processing unit 321 (Step S30 to Step S32). The two time slots of 4-lane signals are accumulated by the symbol accumulation unit 21 to be used in processing downstream of this step. The symbol accumulation method can be changed by request from the outside (not shown).

The bit likelihood calculation unit 22 restores the original bits from the eight-dimensional signal made up of two time slots of 4-lane signals (Step S33 and Step S34). The eight-dimensional signal carries 7 bits (b0 to b6) of information. A likely combination of seven bits is selected from 128 (2 to the seventh power) combinations. Soft decision in which reliability information is given may be used in combination. The search of 128 combinations means heavy processing load, and it is therefore desirable to lighten the processing load by applying Min-sum or a similar method that is commonly used to accomplish efficient error correction decoding processing.

The bit likelihood calculation method can be changed by request from the outside (not shown).

The logical lane order control unit 23 performs order control on seven bits (b0 to b6) of information in total obtained through the processing in the bit likelihood calculation unit 22, plus reliability information about the reliability of the seven bits of information in some cases, so that the consistency with the coding in the code processing unit 111 is established, and outputs the information to the decryption processing unit 323.

The logical lane order control method can be changed by request from the outside (not shown).

In the method described in Patent Literature 1, the signal point arrangement of QPSK alone is not enough to accomplish the same frequency utilization efficiency as in the fourth embodiment, which is 3.5 bits/symbol (per two polarized waves), and the signal point arrangement of 8 PSK is used in combination, thereby raising the precision demanded of hardware and in signal processing, and increasing the circuit installation load. The fourth embodiment, in which only the signal point arrangement of QPSK is used, has another advantageous effect in that the demands for precision and the increase in circuit installation load are suppressed, which leads to efficient circuit installation.

The symbol rate per channel in the present invention is assumed to be mainly within a range of 1 G symbol/s to 100 G symbols/s. However, the symbol rate in the present invention is not limited to this range. Signals having different symbol rates may be used in a plurality of channels.

The premise of the descriptions on the first to fourth embodiments given above is that a complementary set of a polarization multiplexed QPSK signal (4 bits/symbol) is used as the signal point arrangement. This lowers the frequency utilization efficiency, which is originally 4 bits/symbol, to 3 to 3.5 bits/symbol, thereby obtaining coding gain and making Stokes vectors orthogonal between adjacent time slots, and resistance against the polarization-dependent deterioration phenomena can consequently be enhanced. The frequency utilization efficiency can also be improved by increasing the number of levels of a multilevel modulation method that serves as the basis.

The optical transmission method and optical transmission system according to the present invention are useful for large-capacity optical transmission over long distance.

The configurations described in the first and second embodiments described above are given as an example of the specifics of the present invention, and can be combined with other known technologies, and part of the configurations may be omitted or modified without departing from the spirit of the present invention.

The invention claimed is:

1. An optical transmission method, comprising:
executing mapping processing so that information of one unit of one system, or one unit of each of a plurality of systems, is mapped in a pattern of two or more Stokes vectors orthogonal between slots of a multi-time slot;
generating an optical signal from an electric signal processed by the mapping processing, and transmitting the optical signal;
receiving the optical signal and converting the received optical signal into an electric signal; and
executing de-mapping processing for conversion into the information of the one unit of the one system, or the one unit of each of the plurality of systems, by selecting high-likelihood bit information in association with the mapping processing in which the information is mapped in the pattern of the two or more Stokes vectors orthogonal between the slots of the multi-time slot,
wherein the executing mapping processing comprises mapping one unit of information, which is made op of three bits, belonging to a first system out or two systems and one unit of information, which is made up of three bits, belonging, to a second system out of the two systems in the pattern of the two or more Stokes vectors orthogonal between two adjacent time slots, and
wherein the executing mapping processing composes mapping, the two units of information m the pattern of the two or more orthogonal Stokes vectors by performing single-parity check coding on three bits that are one unit of information of the first system out of the two systems to generate a fourth bit for the first system, and by performing single-parity check coding on three bits that are one unit of information of the second system out of the two systems to use an inversion of a resultant bit as a fourth bit for the second system.

2. The optical transmission method according to claim 1, wherein the executing mapping processing comprises using waves of quadrature dual polarization (X/Y), axes of quadrature binary phase (I/Q), and two time slots (1/2), to allocate, as the two or more Stokes vectors, four bits in 4-bit signal of the first system to four lanes, XI1, XQ1, YI2, and YQ2, and four bits in 4-bit signal of the second system to four lanes, YI1, YQ1, XI2, and XQ2.

3. The optical transmission method according to claim 1, wherein the executing mapping processing comprises using waves of quadrature dual polarization (X/Y), axes of quadrature binary phase (I/Q), and two time slots (1/2), to allocate, as the two or more Stokes vectors, four bits in 4-bit signal of the first system to four lanes, XI1, XQ1, XI2, and XQ2, and four bits in 4-bit signal of the second system to four lanes, YI1, YQ1, YI2, and YQ2.

4. The optical transmission method according to claim 1, wherein the executing mapping processing comprises using waves of quadrature dual polarization (X/Y), axes of quadrature binary phase (I/Q), and two time slots (1/2), to allocate, as the two or more Stokes vectors, four bits in 4-bit signal of the first system to four lanes, XI1, XQ1, YI1, and YQ1, and four bits in 4-bit signal of the second system to four lanes, XI2, XQ2, YI2, and YQ2.

5. An optical transmission method, comprising:
executing mapping processing so that information of one unit of one system, or one unit of each of a plurality of systems, is mapped in a pattern of two or more Stokes vectors orthogonal between slots of a multi-time slot;
generating an optical signal from an electric signal processed by the mapping processing, and transmitting the optical signal;
receiving the optical signal and converting the received optical signal into an electric signal; and
executing de-mapping processing for conversion into the information of the one unit of the one system, or the one unit of each of the plurality of system, by selecting high-likelihood bit information in association with the mapping processing in which the information is mapped in the pattern of the two or more Stokes vectors orthogonal between the slots of the multi-time slot,
wherein the executing mapping processing comprises mapping one unit of information, which is made up of seven bits, in a first system in the pattern of two or more Stokes vectors orthogonal between two adjacent time slots, and
wherein, the executing mapping processing comprises mapping one unit of information of the first system in the pattern of the two or more orthogonal Stokes vectors by performing single-parity check coding on the seven bits that are the one unit of information of the first system to use an inversion of a resultant bit as an eighth bit.

6. The optical transmission method according to claim 5, wherein the executing mapping processing comprises using waves of quadrature dual polarization (X/Y), axes of quadrature binary phase (I/Q), and time slots (1/2), to allocate, as the two or more Stokes vectors, eight bits in the 8-bit signal of the first system to eight lanes, XI1, XQ1, YI1, YQ1, XI2, XQ2 YI2, and YQ2.

7. An optical transmission system, comprising:

an optical transmitter including a mapper, which is configured to execute mapping processing so that information of one unit of one system, or one unit of each of a plurality of systems, is mapped in a pattern of two or more Stokes vectors orthogonal between slots of a multi-time slot, and an optical signal generator, which is configured to convert an electric signal processed by the mapping processing into an optical signal;

an optical path configured to transmit the optical signal generated by the optical transmitter; and an optical receiver including an optical signal detector, which is configured to detect the optical signal transmitted from the optical path and convert the detected optical signal into the electric signal, and a de-mapper, which is configured to perform, on the electric signal, de-mapping processing for conversion into the information of the one unit of the one system, or the one unit of each of the plurality of systems, by selecting high-likelihood bit information in association with the mapping processing in which the information is mapped in the pattern of the two or more Stokes vectors orthogonal between the slots of the multi-time slot, wherein the executing maiming processing comprises snapping one unit of information, which is made tin of three bits, belonging to a first system out of two systems and one unit of information, which is made up of three bits, belonging to a second system out of the two systems in the pattern of the two or more Stokes vectors orthogonal between two adjacent time slots, and wherein the executing mapping processing comprises mapping the two units of information in the pattern of the two or more orthogonal Stokes vectors by performing single-parity check coding on three bits that are one unit of information of the first system out of the two systems to generate a fourth bit for the first system, and by performing single-parity check coding on three bits that are one unit of information of the second system out of the two systems to use an inversion of a resultant bit as a fourth bit for the second system.

* * * * *